July 22, 1952     A. J. JOHN     2,604,243
FISH STRINGER
Filed Feb. 23, 1949
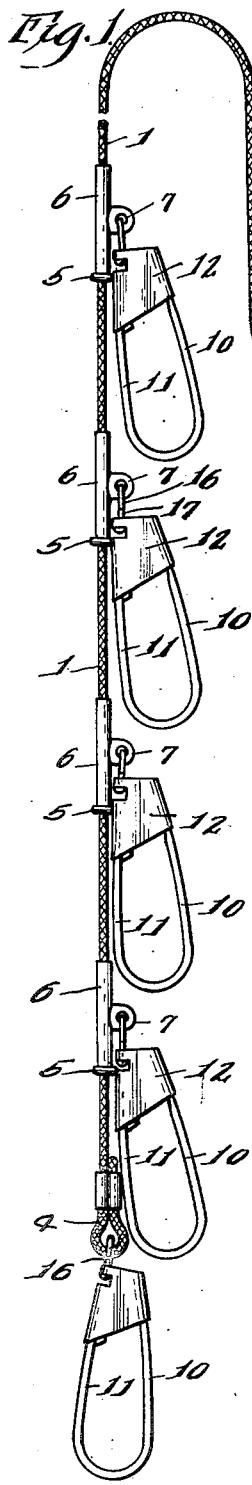
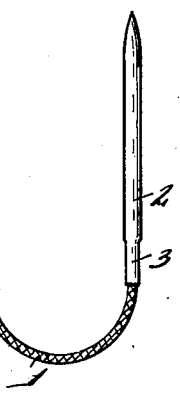
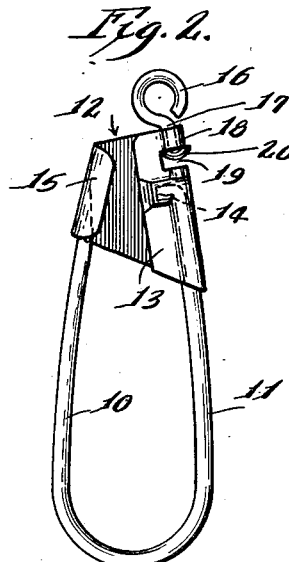
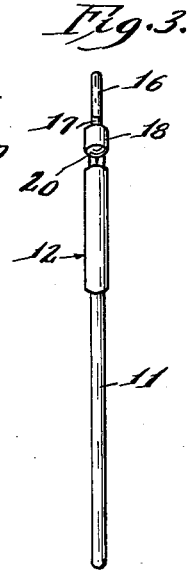
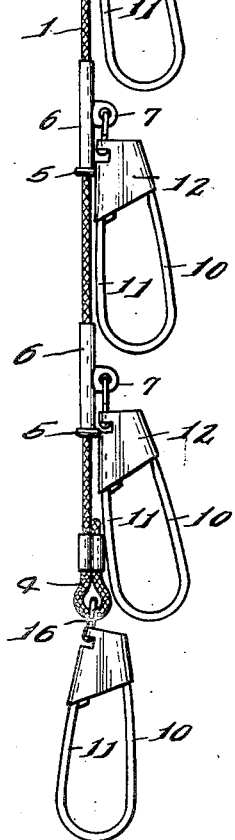
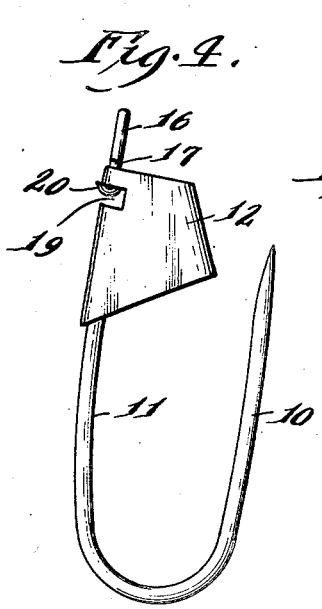
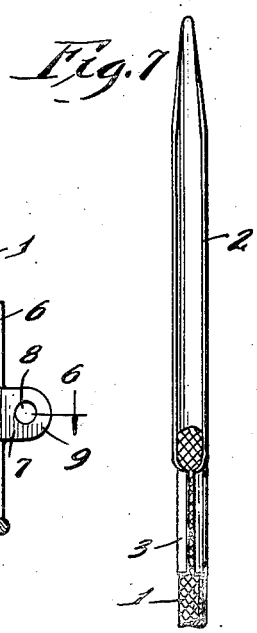
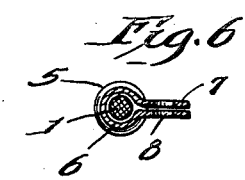
Inventor
Albert J. John,
By Wm F. Freudenreich,
Attorney.

Patented July 22, 1952

2,604,243

UNITED STATES PATENT OFFICE 2,604,243

FISH STRINGER

Albert J. John, Cicero, Ill.

Application February 23, 1949, Serial No. 77,757

2 Claims. (Cl. 224—7)

There are a number of different devices used for stringing fish, as they are caught, to allow them to be tethered in the water and unable to escape. Heretofore the main purpose usually has been to make stringing easy without regard to the comfort or complete safety of the fish. Also, where individual hooks for the fish have been provided, the fish have not been enabled to swim freely and entanglements have resulted. Some fish in a string group frequently tear loose from the holding devices and are thus lost, regardless as to which of the old types of stringers is used. Also, when the hooks have been allowed to remain on empty stringing lines, such lines have become tangled when thrown in a heap into a corner or into some container until another fishing day; thereby requiring a fisherman to untangle his stringer or stringers when he again desired to use the same.

The present invention has for its primary object to produce a simple, novel and efficient fish stringer that cannot become tangled during usual handling while out of the water or while serving as a tether for a number of fish in the water, and which shall allow a maximum freedom of movement of the fish while they remain in the water.

The various features of novelty whereby the present invention is characterized will hereinafter be pointed out with particularity in the claims, but for a full understanding of the invention and of its objects and advantages, reference may be had to the following detailed description taken in connection with the accompanying drawing, wherein:

Figure 1 is an elevational view of a fish stringer embodying my invention in a preferred form, a portion thereof between the two ends being broken away; Fig. 2 is an elevational view, on a larger scale, of one of the hook members, showing the opposite side from that seen in Fig. 1; Fig. 3 is an edge view of the hook as it appears in Fig. 2; Fig. 4 is a view of one of the hooks, opened, on the same scale as Fig. 2, but showing the same side as does Fig. 1; Fig. 5 is an elevational view of a piece of the flexible line, with one of the stop shoulders thereon and one of the hook-carrying sleeves both in section; Fig. 6 is a section on line 6—6 of Fig. 5; and Fig. 7 is an elevational view of the tip of the stringer, showing the opposite side from that visible in Fig. 1.

In the drawing, 1 represents a flexible member or line, that may be a cord, cable or chain, a braided cord being shown. On one end of the line is a long needle-like metal tip 2, formed of a piece of sheet metal bent into a trough-like shape, except that for a short distance at the butt end the bent shape consists of a tube 3 pressed tightly upon one end of the line. The other end of the line may be made into a loop 4. Beginning a few inches from the looped end, I provide a series of fixed shoulders on the line, these being preferably metal rings 5 that are applied to the line in an open condition and then closed tightly upon the line; these shoulders being preferably at least four inches apart.

Surrounding the line are metal sleeves 6, that have internal diameters larger than the diameter of the line, there being one of these sleeves above each of the shoulders. The sleeves are preferably less than half as long as the distance between the shoulders on the line, so that they may slide a considerable distance along the line. The sleeves may conveniently be formed of sheet metal rolled into tubular shape, the meeting edges thereof being provided with small, like registering ears 7, 7, midway between their ends. These ears are bent outward so as to lie close together in parallel relation to each other, radial to the axis of the sleeve on which they are located. Each ear contains a round opening 8 concentric with an outer or end edge 9 that forms an arc of a circle having the same center as the opening.

Each sleeve serves as a carrier of a hook for securing a fish to the line. The hooks are of the safety pin type, comprising a U-shaped wire member one arm 10 of which is pointed at its free end; the other arm 11 being fixed to a keeper 12 into which the point of the hook is latched. The keeper is shown as comprising a plate of sheet metal flanged as at 13 along one edge to overlie the end of arm 11 and clamp it to the body of the keeper. In order to make the grip more secure, the extreme end of arm 11 may be bent laterally as at 14, so that the keeper contains an L-shaped pocket in which the correspondingly shaped arm end fits. A second marginal portion of the keeper plate, along the edge opposite that at which the flange 13 is located, is bent inward to produce a second flange 15 paralleling and spaced apart from the flat body portion of the keeper. The point of the hook snaps underneath this second flange, as in the case of the ordinary safety pin.

Each hook is connected to one of the sleeves 6 by a compound swivel device. This device includes a ring or eye 16 that is threaded through the registering holes in the ears on one of the sleeves, in an open condition, and is then closed to prevent separation from the ears. Each such ring or eye has a radial stem 17 that extends through a tubular bearing 18 that forms a part of flange 13 of the keeper. The internal diameter of the ring or eye 16 is greater than the radius of the curved edges 9 of the ears on sleeves 6. This bearing extends longitudinally of the hook and terminates at a gap or notch 19 through the edge of the keeper and into the flange 13 and the underlying portion of the body portion; this notch being located not far from the upper end of the keeper. Stem 17 extends down into this notch or gap and there is swaged to create a head 20 that prevents withdrawal of the stem from the tubular bearing. The eyes with their stems are therefore anchors that have swivel connections with the hooks.

One of the hooks may be attached to the lower end of the line by threading its ring or eye through loop 4.

When a fish is attached to one of the hooks he is free to swing indefinitely entirely around the line, swing through an angle of 180° lengthwise of the line and turn indefinitely about its own longitudinal axis because of the swivel connection with the carrier sleeve. The entire hook may also move bodily several inches along the line because of the very considerable distance between the stops on the line. Consequently there is no danger of entanglement of the fish with the line. After a number of fish have been attached, they can easily remain clear of each other and entanglement with the line is avoided because of the extreme flexibility of the connections with the line. And, as previously stated, this flexibility of the connections for the hooks and their freedom of movement in all directions makes it impossible for the stringer to become tangled to such an extent that it will not clear itself when it is shaken briskly.

While I have illustrated and described with particularity only a single preferred form of my invention, I do not desire to be limited to the exact details thus illustrated and described, but intend to cover all forms and arrangements that come within the definitions of my invention constituting the appended claims.

I claim:
1. A device for securing a fish to a stringing line comprising a hook of the safety pin type having at one end a sheet metal keeper for the pointed end of the hook, a portion of the keeper being in the form of a short tube extending longitudinally of the hook, a ring provided with a projecting radial stem that extends loosely through said tube and is headed at its free end to prevent its withdrawal from the tube, and a long sleeve having at about the middle an external ear that is small, flat and contains an opening, the outer portion of the edge of the ear being an arc of a circle the center of which is at said opening and whose radius is less than the diameter of the ring; the ring being threaded through said opening.

2. A device for securing a fish to a stringing line comprising a hook of the safety pin type having at one end a sheet metal keeper for the pointed end of the hook, a portion of the keeper being in the form of a short tube extending longitudinally of the hook, a ring provided with a projecting radial stem that extends loosely through said tube and is headed at its free end to prevent its withdrawal from the tube, and a long sleeve having at about the middle an external ear that is small, flat and contains an opening; the ring being threaded through said opening.

ALBERT J. JOHN.

REFERENCES CITED

The following references are of record in the file of this patent:

UNITED STATES PATENTS

| Number | Name | Date |
|---|---|---|
| 1,407,221 | Reimers | Feb. 21, 1922 |
| 1,713,779 | Overton | May 21, 1929 |
| 2,004,247 | McCaul | June 11, 1935 |
| 2,062,386 | Withey | Dec. 1, 1936 |
| 2,226,402 | Hirschmann | Dec. 24, 1940 |
| 2,297,623 | Hickman | Sept. 29, 1942 |
| 2,517,761 | Boyer | Aug. 8, 1950 |